July 23, 1929.               B. IRWIN                1,722,091
                      OVER DRIVE TRANSMISSION
                      Filed Nov. 7, 1928         2 Sheets-Sheet 1

INVENTOR
Bartley Irwin

July 23, 1929.  B. IRWIN  1,722,091

OVER DRIVE TRANSMISSION

Filed Nov. 7, 1928  2 Sheets-Sheet 2

INVENTOR.

Bartley Irwin

Patented July 23, 1929.

1,722,091

UNITED STATES PATENT OFFICE.

BARTLEY IRWIN, OF LONG BEACH, CALIFORNIA, ASSIGNOR OF FOUR-TENTHS TO ROY H. CUMMINGS, OF LONG BEACH, CALIFORNIA.

OVERDRIVE TRANSMISSION.

Application filed November 7, 1928. Serial No. 317,815.

My inventon relates primarily to a transmission designed to be auxiliary to the present transmissions with which auto vehicles are equipped and it has for its object the provision of such means as will enable the driver of the vehicle to step up the speed of the vehicle relative to the engine speed, or in other words change the speed ratio, so that when traveling on level roads or highways the vehicle may be driven at a higher rate of speed relatively to the engine speed than the usual direct drive will permit.

Another object is to provide mechanism of the above character which will be simple and efficient in operation and which may be inserted in the present equipment of autovehicles without materially altering the same, or which may be made a part of the regular equipment thereof.

A still further object is to provide equipment of the above character which will be cheap and simple in construction.

Other objects and advantages will appear hereinafter and while I have shown and will describe the preferred form of my invention I wish it specifically understood that I do not limit myself to such preferred form but that various changes and adaptations may be made therein without departing from the spirit of my invention.

In the drawings accompanying and forming a part hereof:

Fig. 1 is a central vertical section through my invention.

Fig. 2 is a top plan of my gear box with the cover removed.

Figure 4:
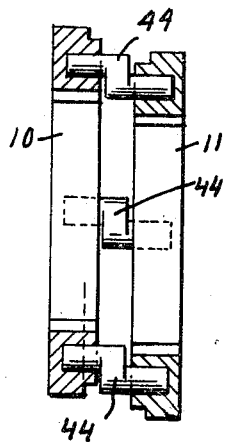
Fig. 4, 5 and 6 are details showing diagrammatically the essential features of my invention.
Figure 5:
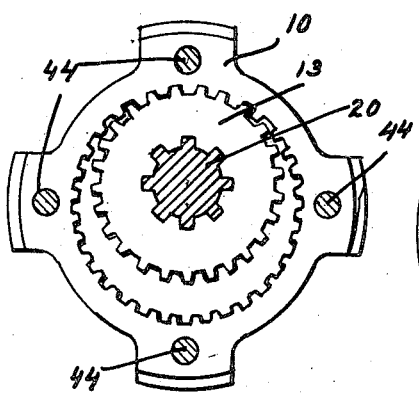
Figure 6:
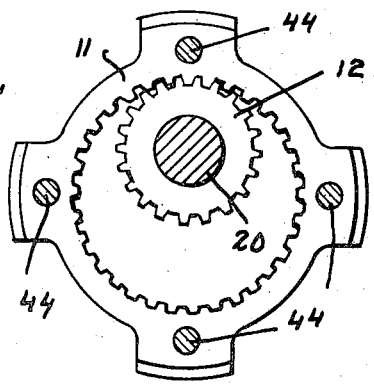
Figure 7:
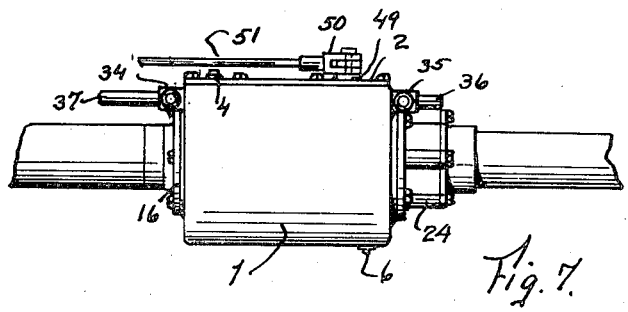
Fig. 7 is a view showing the application of my device to the driving mechanism of an automobile.
Figure 3:
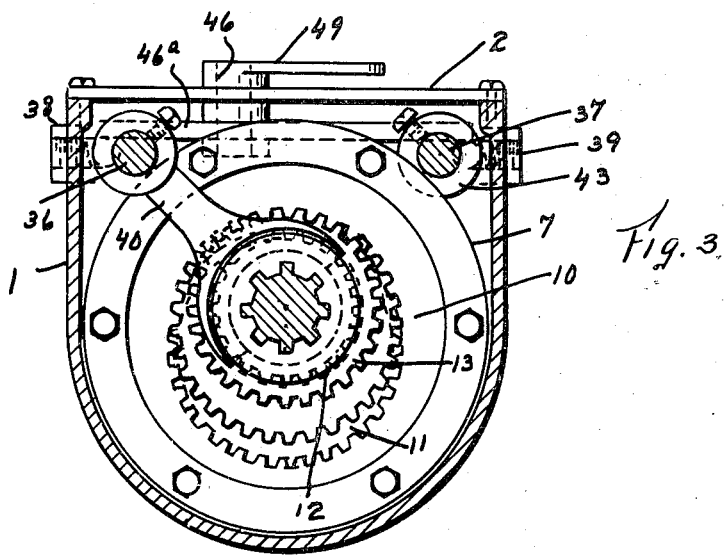
Fig. 3 is a section on the line 3—3 of Fig. 1.

Referring to the drawings in which like numbers refer to like parts throughout the several views, 1 represents the outer casing or gear box provided with a suitable cover 2 in which is provided the grease inlet 3 normally closed by the plug 4.

A grease outlet or drain opening 5 is provided in the bottom of the case 1, and is normally closed by the plug 6.

Extending upwardly from the bottom of case 1 near one end is an annular housing 7 in the outer faces of which are provided the gear races 8 and 9 for the ring gears 10 and 11 respectively.

Gears 10 and 11 are internal gears and mesh with the gears 12 and 13. It will be noticed that these gears 12 and 13 are mounted to rotate around the same axis and that gear 13 is larger in diameter than gear 12. It will also be noticed that the internal gears 10 and 11 are of the same interior diameter and that they are mounted to rotate around axis in different planes, gear 10 in mesh with gear 13 and gear 11 in mesh with gear 12. These gears 10 and 11 are rotatively connected by means of crank shaped toggles 14, there being four of these cranks positioned equally, but more or less may be used as may be found necessary or desirable. Provided in one end of case 1 is an opening 15 and in this opening is mounted the bearing bracket 16 by means of the bolts 17, and formed within this bracket is a bearing chamber 18 in which is mounted a roller bearing 19 which bearing revolubly supports one end of the shaft 20. The other end of shaft 20 is revolubly mounted within the inner end of the sleeve 21 upon the inner end of which is formed the gear 12. The other end of sleeve 21 is rotatably supported within a roller bearing 22 which roller bearing is housed within a housing 23 formed within the bearing bracket 24. Bracket 24 is positioned within an opening 25 in the other end of the casing 1 and is held secured by means of the bolts 26. Provided midway of the length of the shaft 20 is a collar 27 which is positioned between the internal gears 10 and 11 and serves to limit the movement of the gears 12 and 13 towards each other. The portion of the shaft 20 between the roller bearing 19 and the collar 27 is splined and it is upon this splined portion that the gear 13 is mounted, said gear being splined to correspond with said shaft so as to be slidably but non-revolubly engaged therewith. The other end of shaft 20 is provided with short splines 29 adapted for engagement with the short splines 30 within the inner end of the sleeve 21. The other or outer end of the sleeve 21 is provided with long splines 31 which are in engagement with the splines of the connecting shaft 33. Slidably mounted at their ends in bearings 34 and 35 provided in the outer ends of case 1 near the side walls thereof are the shifting shafts 36 and 37 which shafts are adapted to be held in their adjusted positions by the usual ball and socket retainers 38 and 39.

Rigidly secured upon shifting shaft 36 is a fork 40 which extends downwardly at an angle and engages the groove 41 in the hub 42 of the gear 13 and provides means for sliding said gear along shaft 20 into and out of engagement with the gear 10. A similar fork 43 is rigidly secured upon shaft 37 and engages the groove 44 in collar 45 rigidly mounted upon sleeve 21, and provides means for sliding said gear and sleeve relatively to shaft 20 as hereafter explained. Pivotally mounted intermediate its ends upon the underside of cover 2, by means of pintle 46 is the shifting lever 46ª, the free ends of which are rounded and are mounted within the recesses 47 and 48 in the shifting shafts 36 and 37. Pintle 46 projects through the cover 2 for a short distance upwardly and upon this projecting end is rigidly mounted one end of a link 49. The other end of link 49 is connected by a clevis 50 to one end of the pull rod 51, the other end of which extends forwardly or rearwardly as the case may be and is then connected to any suitable mechanism for operating the same manually. A plurality of apertures are provided in the wall of sleeve 21 to provide passage for lubricant to the interior thereof and a thrust bearing 54 is provided between the ends of the shafts 20 and 33.

In the operation of my device:

It will be understood that the outer or free end of the shaft 20 will be connected to the power mechanism and that the outer or free end of the shaft 33 will be connected to the ropeller shaft and that my device is not designed or intended to replace the usual gearset of the vehicle but is auxiliary or additional thereto. In the drawings I have shown my device in its operative position. Should it be desired to render the device inoperative the shifting lever will be rocked upon its pivot to slide shafts 36 and 37 in opposite directions to cause the forks 40 and 43 to slide the gears 12 and 13 out of engagement with the gears 10 and 11. As sleeve 21 and with it its integral gear 12 is moved away from gear 11 and splines 29 will engage with the splines 30 thus locking shafts 20 and 33 together when the power from shaft 20 will be transmitted to shaft 33 direct. In operation with the parts as shown in the drawings, as gear 12 rotates it will rotate the ring gear 10 and gear 10 will in turn, through the crankshaped toggles 14 rotate the ring gear 11. Gear 11 will rotate the gear 12 which will through its splines and sleeves 21 rotate the shaft 33. It is, of course, understood, that the throw of the cranks will be governed by the difference in the diameters of the gears 12 and 13.

Having described my invention what I claim is:

1. A device of the character described comprising a driving shaft and a driven shaft mounted to rotate around a common axis, a gear mounted on each of said shafts to rotate therewith, one of said gears being smaller than the other, said gears being movable lengthwise of their respective shafts, means to move said gears lengthwise in unison, a pair of ring gears adapted for engagement with said first gears, one for each gear, said ring gears being mounted to rotate around axes in different planes from each other and said first gears; and flexible connections between said ring gears whereby the same are caused to rotate in unison.

2. An overdrive transmission for autovehicles comprising a drive shaft and a driven shaft mounted to rotate around a common axis; a gear mounted upon the adjacent ends of each of said shafts, one of said gears being smaller than the other, a pair of internal gears of equal diameters but larger than the first gears, adapted for engagement with said first gears, said internal gears being mounted to rotate around axes in different planes from each other and said first gears; and flexible connections between said internal gears whereby motion from one is imparted to the other.

3. An overdrive transmission for autovehicles comprising a driving shaft and a driven shaft mounted to rotate around a common axis, a pair of internal gears operatively connected together to rotate around axes different from each other and said shafts; a gear slidably and non-revolubly mounted on said driving shaft adapted to be brought into mesh with one of said internal gears to rotate the same, a sleeve slidably and non-revolubly mounted at one end upon one end of said driven shaft and at its other end being slidably and revolubly mounted upon the end of said driving shaft; clutch members on the adjacent ends of said sleeve and driving shaft adapted to cooperate to connect said shaft and sleeve together at predetermined times; gear teeth on one end of said sleeve adapted for engagement with the teeth of the other of said internal gears to be rotated thereby;

4. An overdrive transmission for autovehicles comprising a driving shaft and a driven shaft; a pair of spaced internal gears mounted to rotate around axes in different planes from each other and said shafts; a gear slidably but non-revolubly mounted on said driving shaft adapted for operative engagement with one of said internal gears; a sleeve slidably and revolubly mounted upon said driving shaft having a gear formed on one end thereof adapted for cooperative engagement with the other internal gear and having its other end slidably and non-revolubly mounted on said driven shaft, clutch members on the adjacent ends of said sleeve and driving shaft adapted to cooperate to rotatably connects the same together.

In witness that I claim the foregoing I have hereunto subscribed my name this 28th day of July, 1928.

BARTLEY IRWIN.